United States Patent [19]
Keith, Jr. et al.

[11] Patent Number: 5,381,595
[45] Date of Patent: Jan. 17, 1995

[54] PLATE JOINER

[75] Inventors: James A. Keith, Jr., Pickens; William S. Bellew, Greer; James R. Sistare, Sr., Pickens, all of S.C.

[73] Assignee: Ryobi Motor Products, Corp, Easley, S.C.

[21] Appl. No.: 116,285

[22] Filed: Sep. 3, 1993

Related U.S. Application Data

[63] Continuation-in-part of Ser. No. 54,640, Apr. 27, 1993, Pat. No. 5,291,928.

[51] Int. Cl.$^6$ .......................... B23Q 3/00; B27M 1/00
[52] U.S. Cl. ......................................... 29/467; 29/428; 83/875; 144/136 C; 144/329; 144/371
[58] Field of Search ................. 29/428, 445, 466, 467, 29/468; 30/374, 377, 375; 83/875; 144/134 D, 136 C, 371, 329; 409/178, 182

[56] References Cited

U.S. PATENT DOCUMENTS

| | | |
|---|---|---|
| 2,635,655 | 4/1953 | Linstead . |
| 2,952,281 | 9/1960 | Weber . |
| 4,858,661 | 8/1989 | Bosten et al. . |
| 4,913,204 | 4/1990 | Moores et al. . |
| 4,926,916 | 5/1990 | Legler et al. . |
| 4,934,422 | 6/1990 | Hempy et al. . |
| 4,947,908 | 8/1990 | O'Banion et al. . |
| 4,971,122 | 11/1990 | Sato et al. . |
| 5,291,928 | 3/1994 | Keith, Jr. et al. . |

Primary Examiner—W. Donald Bray
Attorney, Agent, or Firm—Brooks & Kushman

[57] ABSTRACT

An adjustable fence for orienting a plate joiner having a body and a rotating generally planar cutter to cut an arcuate slot in a workpiece is disclosed. The fence comprises a base, a handle and fastening means. The base is shiftably affixed to the plate joiner body and has a planar surface forming a first fence oriented generally perpendicular to the plane of the cutter. The base also has a guideway parallel to the first fence. The handle is movably adjustably affixed to the base and has a grip portion adapted to cooperate with a hand of an operator and a planar surface forming a second fence forming an angle relative to the first fence. The handle cooperates with the base guideway enabling the second fence to be adjusted along a guideway axis parallel to the first fence relative to the planar cutter. The handle is pivotal about a transverse axis parallel to the first and second fences to vary the angle of the second fence relative to the first fence. The fastening means selectively fastens the handle to the base in a desired location.

9 Claims, 3 Drawing Sheets

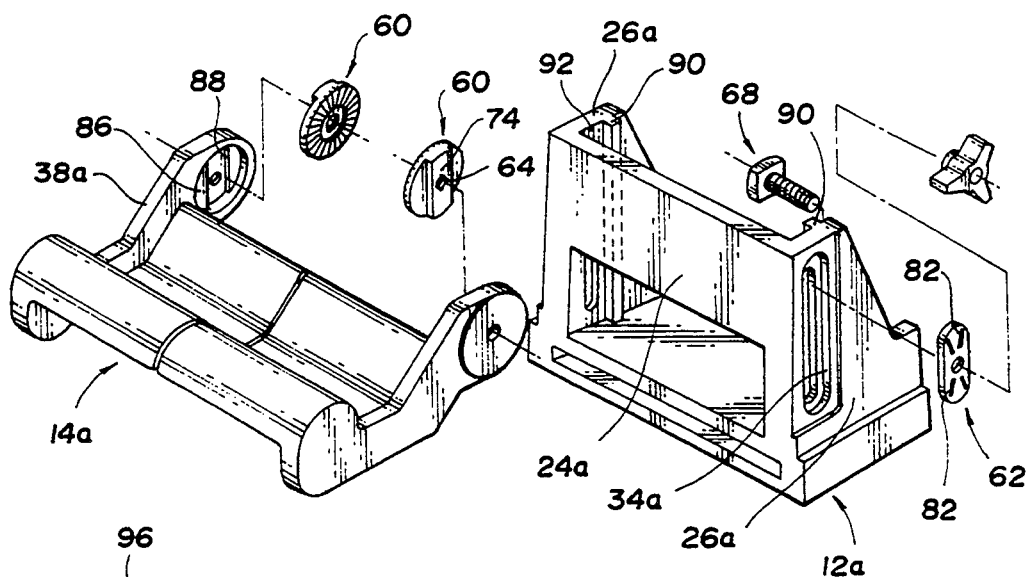
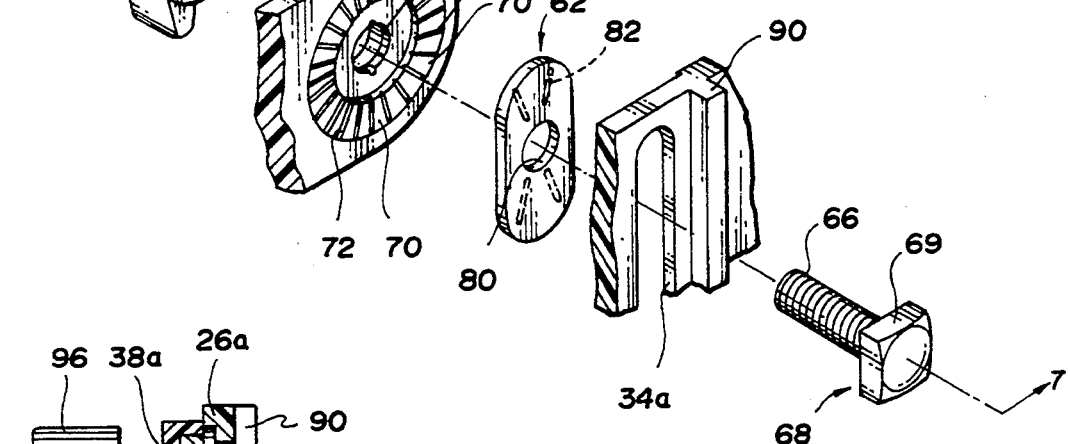
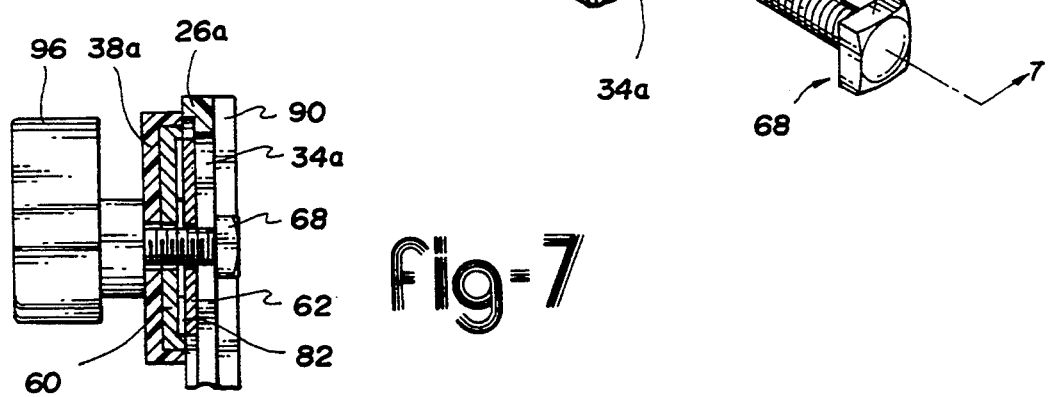

PLATE JOINER

CROSS REFERENCE TO RELATED APPLICATION

This application is a continuation-in-part application of U.S. Ser. No. 08/054,640, filed on Apr. 27, 1993 and entitled Plate Joiner, now U.S. Pat. No. 5,291,928.

TECHNICAL FIELD

This invention relates to plate joiners, and more particularly to an adjustable fence for a plate joiner.

BACKGROUND ART

Traditionally, manufacturers of plate joiners or biscuit joining machines have devised four distinct approaches for cutting biscuit slots. The first approach uses a horizontal-motor. An example of this approach may be seen in U.S. Pat. No. 4,971,122 to Sato et al. and U.S. Pat. No. 4,913,204 to Moores et al. The second approach is to utilize a vertical-motor such as disclosed in U.S. Pat. Nos. 4,858,661 and 4,858,662 to Bosten et al. The third approach is to utilize a joiner/spliner as disclosed in U.S. Pat. No. 4,947,908 to O'Banion et al. The last approach uses a stationary plate joiner as disclosed in U.S. Pat. No. 4,926,916 to Legler et al.

Regardless of the approach adopted, conventional plate joiners have utilized a fence adjustable in two directions. The first adjustment enables the fence to move up and down to accommodate various thicknesses of the workpiece. The second adjustment is to vary the angle of the fence for making angled cuts in the workpiece. U.S. Pat. Nos. 4,971,122 to Sato et al. and 4,913,203 to Moores et al. provide examples of plate joiners with adjustable fences movable in both directions.

In all but the stationary plate joiners, manufacturers have provided a handle to securely hold the plate joiner. Regardless of the type of handle utilized, the handles on conventional plate joiners have been fixed to the body of the plate joiner. Examples of plate joiners having a fixed handle may be seen in U.S. Pat. Nos. 4,947,908 to O'Banion et al.; 4,858,661 and 4,868,662 to Bosten et al.; and 4,913,204 to Moores et al. More recently, U.S. Pat. No. 4,971,122 to Sato et al. utilized a fixed handle which forms a portion of the fence assembly.

Two important factors which should be incorporated into the manufacturing of plate joiners are the cost of the unit and its ease of use.

SUMMARY OF THE INVENTION

The object of the present invention is to provide an adjustable fence for orienting a plate joiner having a body and a cutting blade to cut a workpiece. A fence is provided having a base movably affixed to the plate joiner body. The base has a planar surface forming a first fence portion oriented generally perpendicular to the plane of the cutting blade. The base also has a guide. A handle is provided which is movably affixed to the base. The handle has a first side adapted to cooperate with a hand of an operator. The handle also has a second side with a planar surface which forms a second fence portion cooperating with the first fence portion to orient the cutting blade. The handle cooperates with the guide enabling the second fence portion to axially shift relative to the cutting blade and pivot about a transverse axis to vary the angle of the second fence portion relative the first fence portion.

A further object of the present invention is to provide a method of selectively orienting a plate joiner cutting blade on a workpiece to vary a cut made therein. A base is provided which is axially movable relative to a plate joiner body. The base has a first fence portion having a planar surface oriented generally perpendicular to the plane of the cutting blade cooperating with a first surface of the workpiece. Then, an axially and pivotally movable handle affixed to the base is positioned. The handle has a first side adapted for cooperation with a hand of an operator and has a second side having a planar surface forming a second fence portion cooperating with a second surface of the workpiece. Finally, the handle is fastened relative to the cutting blade and the base in the desired position.

A specific object of the present invention is to provide a handle cooperating with a first fence portion on the base to form a second fence portion adjustable relative to the first fence portion for orienting a plate joiner.

A feature of the present invention is to provide a handle movable relative to a base portion to provide an adjustable fence for a plate joiner.

An advantage of the present invention is to provide a cost competitive, easily adjustable fence on a plate joiner.

The above objects, features and advantages of the present invention are readily apparent from the following detailed description of the invention when taken in connection with the accompanying drawings.

BRIEF DESCRIPTION OF THE DRAWINGS

FIG. 5 is an exploded perspective view of a second and preferred embodiment of the handle, a portion of the base, and fasteners;

FIG. 6 is an enlarged fragmentary exploded view of the handle, the base and fasteners; and FIG. 7 is a partial sectional view of the assembled handle, the base, and fasteners of FIG. 6, taken along line 7—7, cooperating with one another to prevent movement of the handle relative to the base.

DETAILED DESCRIPTION OF THE INVENTION

Figure 1:
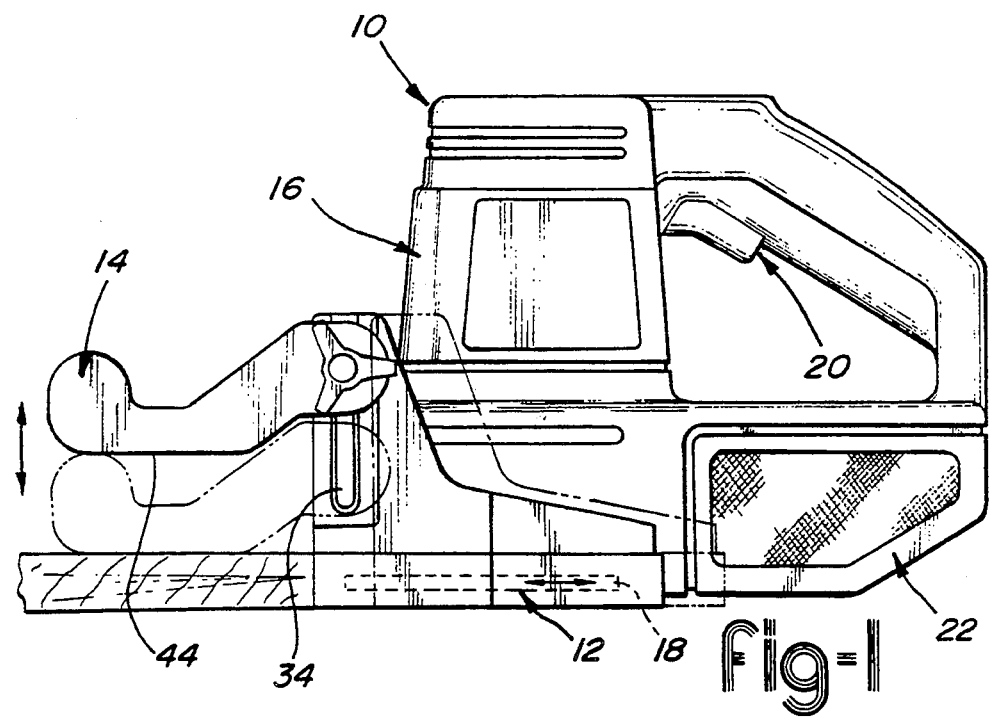
FIG. 1 is a perspective view of a first embodiment of a plate joiner showing a handle assembly axially movable relative to the base.

The first embodiment depicted in FIGS. 1–4 illustrates a plate joiner, generally indicated at 10. The major components of the plate joiner 10 shown in FIG. 1 include a base 12, a handle 14, a body 16, a cutting blade 18, a trigger mechanism 20 and a dust collector 22. For purposes of the present invention, the plate joiner 10 does not require a dust collector 22 and any form of activation means may be substituted for the trigger mechanism 20.

Figure 2:
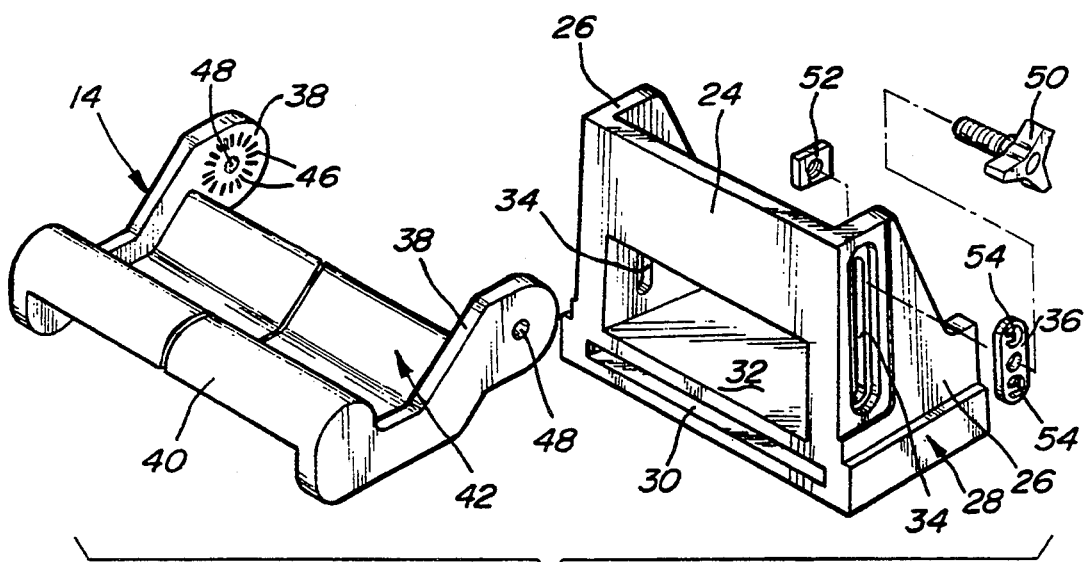
FIG. 2 is a partially exploded perspective view of the elements of the present invention.

As shown in FIG. 2, the base 12 has a first planar surface which forms a first fence 24, a pair of side surfaces 26 and a bottom section 28. A first opening 30 is provided in the first fence 24 for selectively exposing the cutting blade 18. A second opening 32 is provided in the first fence 24 to allow a portion of the body 16 to travel therethrough when the body is moved axially relative to the base 12.

An elongated slot or guide 34 is formed in each of the side surfaces 26. The guide 34 is oriented generally parallel with the first fence 24. The guide 34 is adapted to receive a detent slide 36 which is shaped to be longitudinally slidable within guide 34 but will not pivot. The detent slide 36 has a hole 37 centrally located therein.

Also shown in FIG. 2 is a handle 14 which is formed from a pair of wings 38 integrally connected at opposite ends of grip member 40. The handle 14 has a first side 42 which is adapted to comfortably fit the hand of an operator. To enhance this comfort, the grip member is covered with a structural foam. The handle has a second side (best shown in FIGS. 1 and 3) which has a planar surface forming a second fence 44. The second fence 44 cooperates with the first fence 24 as described below. Located on an inner surface of each of the wings 38 is an array of detents 46 arranged in a circular clock-face pattern.

Centrally located in each of the wings 38 opposite the end adjacent the grip member 40 is located a hole 48 which aligns with the guide 34 on the base 12 when the wings 38 are attached thereto. The handle 14 is movably and pivotably affixed to the base 12 by a pair of thumb screws 50 (note only one of the two thumb screws is shown in FIG. 2) which passes through the hole 48 of the wings 38, the hole of the intermediate fastener 36 and into the guide 34. The thumb screw 50 then threads into a nut 52 mounted on a side opposite the detent slide 36.

Figure 3:
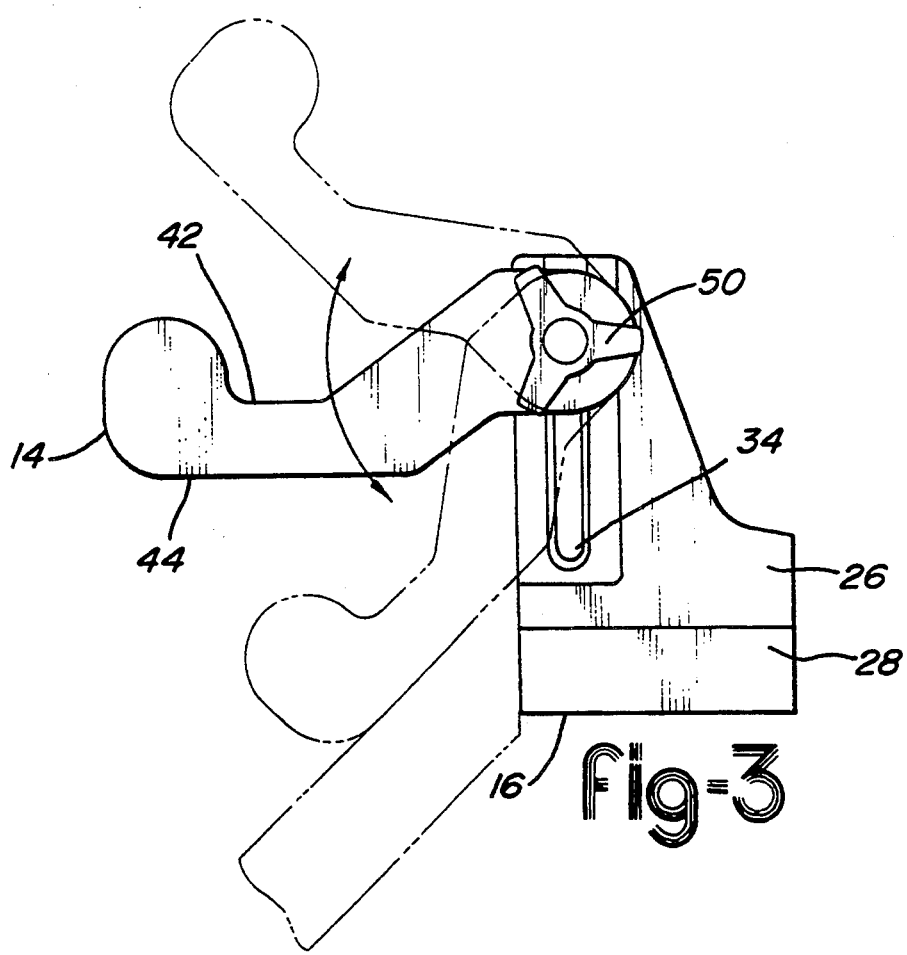
FIG. 3 is a partial perspective view of a portion of the base and the handle showing the handle pivotally movable about the guide.
Figure 4:
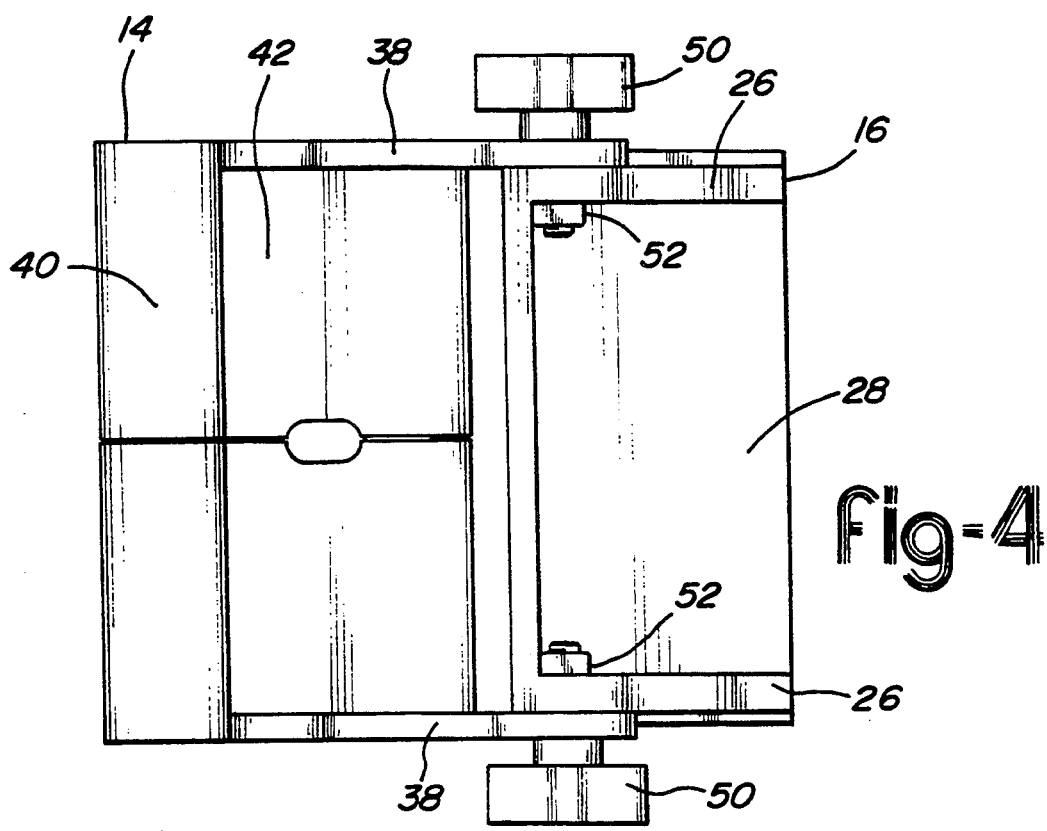
FIG. 4 is a plan view of the handle and a portion of the base showing the handle attached thereto.

As shown in FIGS. 1 and 3, the handle 14 is axially slidable relative to the cutting blade 18 within the guide 34 and the handle is pivotable about a transverse axis of the guide 34 formed by the thumb screw 50. With the handle 14 affixed to the base 12, the thumb screws 50 may be loosened to allow the handle 14 to axially slide with the detent slide 36 within the guide 34 to a desired location, at which point the thumb screw 50 may be again tightened. Alternatively, the thumb screw 50 may be further loosened to allow the handle 14 to be pivoted about the thumb screw to the desired location. This pivotal movement of the handle 14 is accomplished by cooperation of a pair of fingers 54 located on the detent slide 36 which selectively seat within detents 46 to position the handle at the desired angle. The detents 46 are an array of indentations or pockets in the surface of each of the wings 38. Alternatively, the detents can be raised male detents which would cooperate with a corresponding female attachment on the detent slide 36. The spacing between the detents 46 can be varied to correspond to different incremental changes in the angle of the second fence 44, relative to the first fence 24. In this embodiment, the detents 46 are located within the array at increments of 15°. The detents are sized such that, if desired, the operator may position the handle between two detents 46 for a finer adjustment. Once the desired angle has been obtained, the handle may be axially slid within guide 34 as previously stated to a desired location and then the thumb screw 50 is tightened to fasten the handle in the desired location. To ensure a solid connection, the detent slide 36 is constructed of steel.

The first fence 24 and the second fence 44 cooperate with each other to orient the cutting blade 18 of the plate joiner 10 relative to the workpiece to ensure that the cut made therein is at the desired location and at the desired angle. The first fence 24 abuts a first surface of the workpiece AA and the second fence abuts a second surface of the workpiece AA to ensure the desired cut.

The external components of the plate joiner 10, including, but not limited to, the base 12, the body 16 and the handle 14 are constructed of glass filled nylon plastic which combines the characteristics of being light in weight, rigid and able to withstand being bumped or dropped.

A second and preferred embodiment of the invention is shown in FIGS. 5–7. Like components from the first embodiment will be designated with the suffix "a". This second embodiment utilizes a pair of annular inserts 60 which are retained within handle 14a. Annular inserts 60 cooperate with a pair of detent slides 62 to position handle 14a in relation to base 12a. Annular inserts 60 and detent slides 62 are preferably made of powdered metal which is pressed to shape and then sintered.

Each of inserts 60 have a central aperture 64 for receiving a threaded shank 66 of a bolt 68 therethrough. Bolts 68 also have square heads 69. Circumferentially spaced and radially extending about each inner face on inserts 60 are 24 projections 70. Intermediate adjacent projections 70 are formed radially extending recesses 72. On the back or outboard sides of inserts 60 are rectangular shaped blocks 74.

Detent slides 62 have a central aperture 80 therein for receiving threaded shank 66. Four detents 82 are formed on the outboard face of each detent slide 62. These detents 82 extend radially from central aperture 80. Also, detents 82 are sized so that they may be matingly received within four similarly spaced recesses 72 formed in inserts 60.

Each of wings 38a, as best seen in FIG. 5, have an annular depression 86 adapted to receive inserts 60 therein. Projections 70 are generally flush with the inner surface of wings 38a. A rectangular pocket 88 is formed in depression 86 which is sized to receive and prevent rectangular block 74 from rotating within depression 86.

On the inboard surfaces of side surfaces 26a of base 12a, are a pair of generally vertically extending ribs 90. Ribs 90 are spaced from first fence 24a to define channels 92. Channels 92 are sized so that bolts 68 can freely slide and translate within channels 92 without heads 69 being able to rotate.

As indicated in FIG. 6 a bolt 68 passes through elongated guide 34a in side surface 26a, central aperture 80 in detent slide 62, central aperture 64 in insert 60 and retained by a threaded opening 94 in a wing nut 96. As in the first embodiment, detent slides 62 are sized to slide in guides 34a without rotation. Similarly, square heads 69 of bolts 68 are also prevented from rotating as they are captured in channels 92.

Wing nut 96 can be adjusted to clamp the handle 14a to body 12a to thereby prevent movement. The combination of the four detents 82 locating within four corresponding recesses 72 provides a strong stop between handle 14a and base 12a when clamped together. Or else, wing nut 96 can be loosened sufficiently to permit head 69 and detent slide 62 to slide within a respective channel 92 and guide 34a without allowing handle 12a to rotate relative to base 12a. Upon the further loosening of wing nut 96, sufficient axial play can be accorded to permit the detents 82 of detent slides 62 to be withdrawn from cooperating recesses 72. Handle 14a may then be rotated relative to base 12a to a new desired angular position.

Advantages of this second embodiment relative to the first embodiment include greater wear strength by replacing the plastic detents of the first embodiment with the steel recesses 72 of insert 60. This provides for a longer working life between detents 82 of detent slides 62 and recesses 72 of insert 60.

While the best modes for carrying out the invention have been described in detail, those familiar with the art to which this invention relates will recognize alternative designs and embodiments for practicing the invention.

What is claimed is:

1. An adjustable fence for orienting a plate joiner having a body and a rotating generally planar cutter to cut an arcuate slot in a workpiece, the fence comprising:
   a base shiftably affixed to the plate joiner body, the base having a planar surface forming a first fence oriented generally perpendicular to the plane of the cutter and the base having a guideway parallel to the first fence;
   a handle movably adjustably affixed to the base, the handle having a grip portion adapted to cooperate with a hand of an operator, and a planar surface forming a second fence forming an angle relative to the first fence, the handle cooperating with the base guideway enabling the second fence to be adjusted along a guideway axis parallel to the first fence relative to the planar cutter, said handle being pivotal about a transverse axis parallel to the first and second fences to vary the angle of the second fence relative to the first fence; and
   fastening means for selectively fastening the handle to the base in a desired location;
   said fastening means including first and second fastening members which are non-rotatably secured to the respective base and handle, said first fastening member being translatably movable within the guideway and the second fastening member being secured to the handle, said first and second fastening members having elements which are selectively and cooperably fastenable together to prevent relative rotation between the first and second fastening members thereby preventing relative rotational movement between the handle and the base.

2. The fence of claim 1 wherein:
   the handle includes a recess into which the second fastening member is retained.

3. The fence of claim 2 wherein:
   the recess includes a non-circular pocket and the second fastening member includes a block sized and shaped to cooperate with non-circular pocket to prevent relative rotation between the second fastening member and the handle.

4. The fence of claim 1 wherein:
   at least one of the first or second fastening members is made of powdered metal.

5. The fence of claim 1 wherein:
   one of the first or second fastening members has projections thereon and the other of the first or second fastening members has recesses formed therein, the projections being cooperatively receivable within the recesses to prevent rotation between the first and second fastening members.

6. A method of constructing a plate joiner having a planar cutter for cutting an arcuate slot in a workpiece, the method comprising:
   providing a base axially movable relative to a plate joiner body, the base having a first fence having a planar surface oriented generally perpendicular to the plane of the planar cutter to cooperate with a first surface of the workpiece;
   providing a handle having a grip portion adapted for cooperation with a hand of an operator and a second side with a planar surface forming a second fence cooperating with a second surface of the workpiece;
   inserting an insert into a recess of a handle, the recess cooperatively receiving the insert to prevent relative rotation between the insert and the handle;
   inserting a detent into an elongate guideway in the base, the detent being slidable along the guideway;
   positioning axially and pivotally the handle relative to the base; and
   fastening the handle to the base with the insert cooperating with the detent to prevent axial and rotational movement between the handle and the base.

7. The method of claim 6 wherein:
   the step of inserting the insert into the handle includes aligning a non-circular block on the insert with a corresponding pocket in the recess and pressing the insert into the pocket thereby preventing relative rotational movement between the insert and the recess.

8. The method of claim 6 wherein:
   the step of fastening the handle to the base includes engaging projections and recesses formed on the insert and detent to prevent relative rotational movement therebetween.

9. The method of claim 6 wherein:
   the step of fastening the handle to base includes passing a threaded fastener through the insert and the detent and clamping the fastener about the handle and base.

* * * * *